United States Patent Office 2,956,411
Patented Oct. 18, 1960

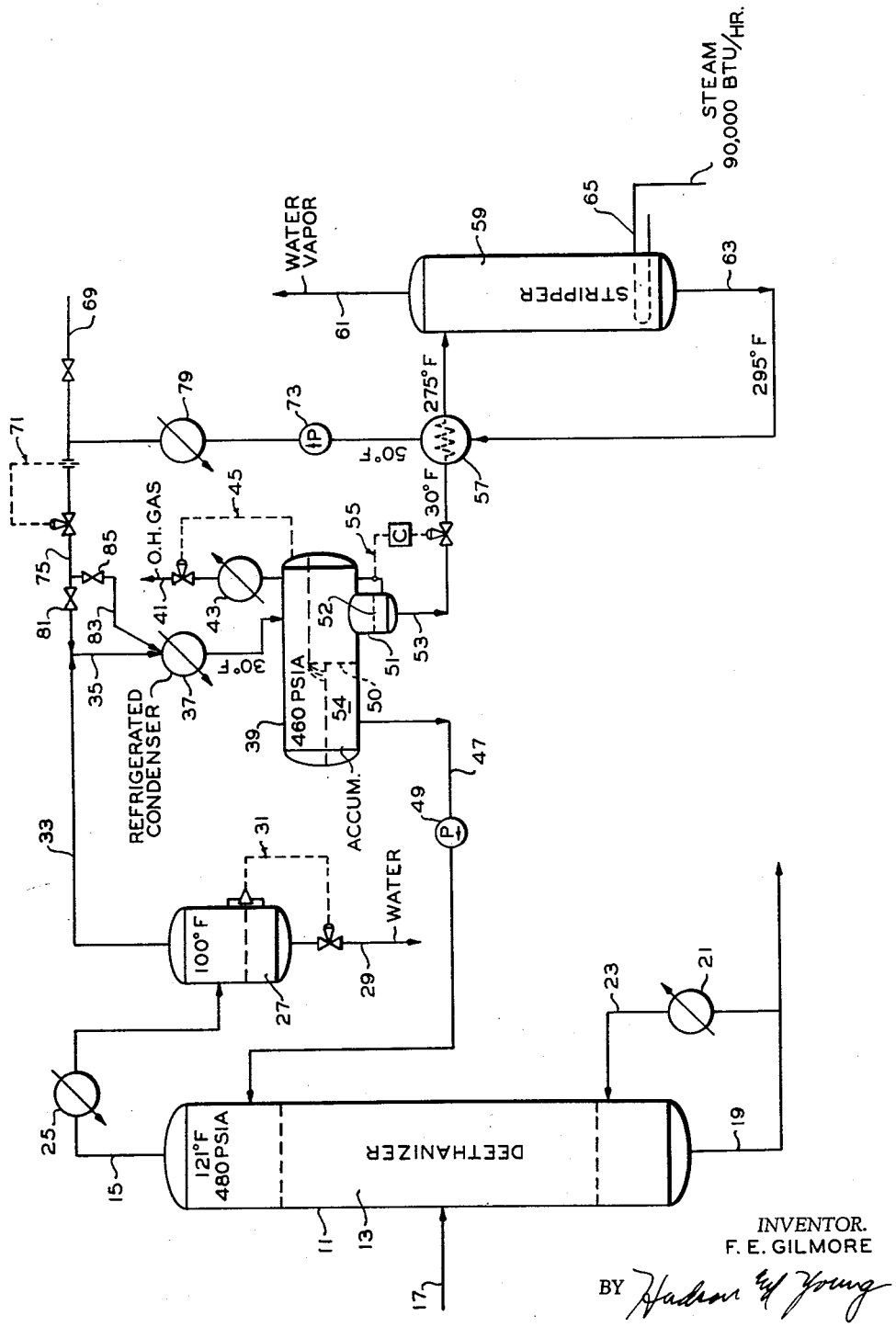

2,956,411

PREVENTION OF HYDRATE FORMATION IN REFRIGERATED OVERHEAD CONDENSER AND ACCUMULATOR

Forrest E. Gilmore, Bartlesville, Okla., assignor to Phillips Petroleum Company, a corporation of Delaware Filed June 24, 1957, Ser. No. 667,596

4 Claims. (Cl. 62—20)

This invention relates to a method for the prevention of the formation of hydrates in overhead refrigerated condensers and accumulators operated for the production of reflux at hydrate formation temperatures in the distillation of feed stocks containing hydrate forming materials. In one aspect the invention relates to a method for the prevention of hydrate formation by adding a heavier than water hygroscopic liquid to the vapor stream ahead of or in the refrigerated condenser to depress the freezing temperature of the water condensed and to dehydrate at least partially the condensate as it is formed. In another aspect the dehydration is carried only sufficiently far to reduce the hydrate formation temperature of the uncondensed overhead gases to a sufficiently low temperature that hydrate or hydrates do not form from vapors in the condenser, accumulator and connecting piping.

As is well known, ethane, ethylene, methane and hydrogen sulfide form hydrates in the presence of moisture under certain conditions.

The problem of hydrate formation in reflux condensers and accumulators which are operated at or below hydrate forming temperatures is a problem of long standing. Various and sundry methods for solving this problem have been proposed. One prior art method involves addition of a liquid desiccant to the upper portion of a fractional distillation column thus countercurrently contacting in the fractionating still downflowing liquid desiccant with the upflowing vaporous material. In this manner substantially complete removal of moisture from the upflowing vapors results. A substantially moisture-free overhead material is thus produced, thereby removing one of the reactants required in the production of hydrates. This prior art procedure obviously requires use of a relatively large distillation column because tray space in the column has to be provided to accommodate downflowing liquid desiccant in addition to internal reflux. This procedure also requires use of relatively large volumes of liquid desiccant. In such an operation liquid transfer pumps and stripping still capacity need to be large in order to handle the large volume of desiccant required. Furthermore, cooling capacity for cooling the relatively large volume of stripping still bottoms (hot lean desiccant) must be provided.

In order to prevent hydrate formation in the overhead condenser and reflux accumulator it is not necessary to dehydrate completely the overhead vapors prior to condensation of reflux. It is only necessary, however, to dehydrate the vapors to a moisture concentration below the minimum moisture concentration at which hydrate or hydrates form at the reflux operating temperature. According to my invention, then, I add only a relatively small volume of liquid desiccant to the overhead vapors with the intended purpose of removing only such a proportion of the moisture that the moisture remaining is not sufficient to promote formation of hydrate.

My invention is applicable to fractional distillation operations in which ethane and/or ethylene are condensed from the overhead vapor for production of reflux. Such distillation operations are sometimes called de-ethanization or de-ethyleneization depending upon which of ethane or ethylene is the highest boiling material intended to remove overhead from the still and absent or substantially absent from the kettle product. Other and lower boiling materials than ethylene and ethane, such as methane and/or hydrogen sulfide, are sometimes present and are taken overhead with the ethane and/or ethylene. De-ethanization is herein defined as the fractional distillation operation in which ethane and all compounds present having normal boiling points below the normal boiling point of ethane are taken overhead and are absent, or absent to a desired degree from the still bottoms. The term de-ethyleneization is herein defined as the fractional distillation operation in which ethylene and all compounds present having normal boiling points below the normal boiling point of ethylene are taken overhead and are absent, or absent to a desired degree from the still bottoms. De-ethyleneization also includes the separation of ethylene from an ethylene and ethane containing feed stock.

As above stated, it is realized that complete dehydration of de-ethanizer overhead vapors is an ideal operation but the apparatus for such an operation is more expensive, as well as are the operating costs.

An object of this invention is to provide a method for at least partial dehydration of overhead vapors from a de-ethanizer or de-ethyleneizer still.

Another object of this invention is to provide a method for lowering or depressing the hydrate formation temperature of moisture containing overhead vapors of a de-ethanizing or de-ethyleneizing still so that hydrate or hydrates do not form in the reflux condenser or accumulator.

Still another object of this invention is to provide such a method which requires use of smaller and less expensive equipment to construct and to operate than that used in prior art methods.

Yet another object of this invention is to provide a method for reducing the freezing point of the water removed from the overhead material in the operation of reducing hydrate formation temperature.

Still other objects and advantages will be realized upon reading the following description which, taken with the attached drawing, forms a part of this specification.

In the production of liquid from the overhead vapors of an operation selected from the group of operations consisting of de-ethanization and de-ethyleneization for refluxing said operation wherein the overhead vapors contain sufficient moisture and hydrate forming material that hydrate forms in a refrigerated condenser operating on the overhead vapors to produce said liquid, my invention includes a method for producing liquid from said vapors for refluxing said operation without hydrate formation comprising introducing a liquid desiccant into a stream of said overhead vapors from said operation, chilling the stream of overhead vapors and desiccant to reflux producing temperature thereby producing condensate, separating a condensate phase from a desiccant containing phase, the separated condensate phase being the produced liquid for refluxing said operation.

The drawing illustrates, in diagrammatic form, one arrangement of apparatus parts suitable for carrying out the process of my invention.

I will describe, merely for exemplary purposes, a de-ethanizing operation in which diethylene glycol is used as the desiccant.

In the drawing reference numeral 11 identifies a conventional de-ethanizing still or fractional distillation column for use in de-ethanizing an ethane containing feed stock. The column is provided with suitable vapor-liquid contacting apparatus 13 for promoting efficient contacting between upflowing vapors and downflowing internal reflux. An overhead vapor line 15 conducts overhead vapor material from the fractional distillation column to a cooler 25. This cooler 25 is an indirect heat exchanger and is intended to condense at least a portion of the moisture content of the overhead vapors by indirect heat exchange with conventional plant cooling water. Water formed in condenser 25 and uncondensed material pass on into a water separator vessel 27 in which the condensed water is separated from uncondensed gases, the water being withdrawn through a pipe 29. A liquid level controller assembly 31 regulates the removal of this condensed water in response to a predetermined level in vessel 27. Condenser 25, operating with plant cooling water, cools materials from pipe 15 to a temperature of about 100° F. from an overhead vapor temperature of about 121° F. in this exemplary operation. The temperatures and pressures given in this disclosure are merely exemplary of one set of operating conditions suitable for carrying out a de-ethanizing operation including the process of my invention. Uncondensed vapors are removed from vessel 27 through a pipe 33 and are passed through a pipe 35 into a refrigerated condenser 37 which is operated at such a temperature that condensate removed therefrom has a temperature of about 30° F. A liquid desiccant, such as diethylene glycol, triethylene glycol, or mixtures thereof, or lithium bromide solution, or the like, is passed from a pipe 75 through a valve 81 and is added to the overhead vapors entering pipe 35 prior to passage into the refrigerated condenser 37. In accumulator 39, since the desiccant diethylene glycol is heavier specifically than and substantially immiscible in hydrocarbons, phase separation of the two materials is relatively simple. A weir 50 is provided in accumulator 39, as ilustrated, so that the specifically heavy desiccant will be segregated on the right-hand side of the weir 50 in leg 51 as liquid 52 with the hydrocarbon overflowing the weir into the left-hand side of the vessel as hydrocarbon liquid 54. The liquid 54 is the intended reflux liquid for refluxing the de-ethanizing operation in column 11. Thus liquid reflux from the accumulator is passed through a pipe 47 under the influence of a pump 49 into at least the upper portion of the column.

The relatively heavy desiccant is withdrawn from accumulator 39 through leg 51, the withdrawal being regulated by a liquid level controller apparatus 55 which functions to regulate operation of a motor valve in pipe 53. This liquid desiccant, containing absorbed moisture, is passed through pipe 53 to a heat exchanger 57 in which the desiccant is heated to a temperature of approximately 275° F. and is then introduced into the upper portion of a stripper column 59. This stripper column is operated in such a manner that at least a portion of the absorbed moisture is stripped from the desiccant for removal through an overhead pipe 61. Stripped desiccant is removed through a bottoms drawoff pipe 63, and is passed through heat exchanger 57 and thence on through a pump 73, a cooler 79, and pipe 75 for readdition to the overhead vapors entering pipe 35. A rate of flow controller 71 is provided in pipe 75, as shown, for regulating the rate of flow of liquid desiccant into the overhead material. A pipe 69 is provided for addition of desiccant for starting the operation and for adding make-up desiccant as required.

A pipe 41 is provided with a heat exchanger 43 and a back pressure regulator assembly 45 to regulate withdrawal of uncondensed gases from accumulator tank 39. This heat exchanger may be used for cooling purposes, as a preliminary cooling step for desiccant in pipe 75, or in some other operation.

It is not absolutely necessary to add the desiccant liquid to the overhead vapors of the distillation column upstream of the inlet to the refrigerated condenser but under some conditions, and if desired, the desiccant liquid is added to the moisture containing vapors at the inlet to the refrigerated condenser. In this case valve 81 in pipe 75 is closed and a valve 85 in pipe 83 is opened so that the desiccant flows from pipe 75 through pipe 83 for addition to the moisture containing stream in pipe 35 at or substantially at the inlet to condenser 37.

Feed stock to this operation is introduced into the fractional distillation column through a pipe 17 at approximately a midlevel vertically of the column. De-ethanized bottoms from this column is removed through a bottoms pipe 19. That portion of the bottoms flowing through pipe 19 required for reboiling is by-passed through a pipe 23 provided with a reboiling heater 21.

In one operation which I will disclose as an example of the operation of my process, a feed stream contains a small concentration of hydrogen sulfide, along with free hydrogen, methane, and relatively large proportions of $C_2$ and $C_3$ hydrocarbons and a small proportion of moisture. As is well known, hydrogen sufide forms a hydrate with moisture as well as do such low boiling hydrocarbons as methane, ethane and ethylene. According to my process as hereinabove described, when such a charge material is de-ethanized in column 11 at a pressure of approximately 480 p.s.i.a. (pounds per square inch absolute) at a top column temperature of 121° F., the refrigerated condenser is operated at such a temperature that the effluent therefrom containing condensed hydrocarbons, aqueous liquid desiccant and uncondensed gas has a temperature of about 30° F. and such operation is carried out without the formation of either a hydrogen sulfide or a hydrocarbon hydrate in the condenser or reflux accumulator or connecting pipes.

To illustrate more clearly such an operation the following tabulation is a specific example in which a feed stock containing the above-mentioned constituents is treated. In the tabulation compositions of important product streams are given along with numerous temperature and pressure operating conditions. The compositions of the several product streams are given in terms of pound mols per hour. The specific liquid desiccant employed in this example is diethylene glycol, which in the tabulation is abbreviated DEG.

| Steam No. | (15) | (29) | (33) | (41) |
|---|---|---|---|---|
| Lb. Mols/Hr.: | | | | |
| $H_2S$ | 0.7 | | 0.7 | 0.08 |
| $H_2$ | 83.2 | | 83.2 | 78.30 |
| $C_1$ | 92.1 | | 92.1 | 50.90 |
| $C_2$ | 686.7 | | 686.7 | 139.00 |
| $C_3$ | 803.6 | | 803.6 | 52.40 |
| $H_2O$ | 4.6 | 1.5 | 3.1 | 0.03 |
| Total | 1,670.9 | | 1,669.4 | 320.71 |
| Temperature of Hydrate Formation, °F. | | | 67 | about 0 |

| Steam No. | (53) | (61) | (75) | (65) | (39) | (11) |
|---|---|---|---|---|---|---|
| Lbs./Hr.: | | | | | | |
| DEG | 2,539 | | 2,539 | | | |
| Water | 220.8 | 55.2 | 165.6 | | | |
| | 2,759.8 | | 2,704.6 | | | |
| Gal./Hr., DEG | | | 294 | | | |
| Wt. Percent, DEG | 92 | | 94 | | | |
| Steam B.t.u./Hr. | | | | 90,000 | | |
| P.s.i.a. | | | | | 460 | 480 |

It is noted that the hydrate formation temperature of stream (33) is 67° F., while after addition of the desiccant the refrigerated condenser effluent has a temperature of 30° F. without hydrate formation. The overhead material need be dehydrated only to the extent that hydrates do not form at 30° F. or at a few degrees below 30° F. as a safety factor.

Another example of the utility of my process is in condensing reflux from overhead vapors produced in a catalytic reformer in which the overhead vapors are refrigerated to a temperature of about 54° F. to avoid excessive loss of propane in the overhead gas. The de-ethanizer column in this case is operated at a pressure of about 475 p.s.i.g. (pounds per square inch gage) and in one type of catalytic reformed feed stock considerable proportion of hydrogen sulfide is present. Such a feed stock containing appreciable hydrogen sulfide easily forms hydrogen sulfide hydrate with moisture at about 54° F. and, accordingly, plugging troubles are encountered in the reflux condenser, accumulator tank and connecting pipes.

In such an operation as in the operation described hereinabove the dehydration of the overhead vapors need not be complete. Thus the desiccant handling system is relatively small since the volume of desiccant liquid required for partial dehydration of these overhead vapors is small. The stripping still and transfer pumps are small for handling the small volume of desiccant. In such an operation diethylene glycol serves as an efficient desiccant and the relatively small equipment required for handling small volumes thereof is quite inexpensive as regards capital investment, operation and maintenance as compared to the apparatus required for treating the entire contents in such a fractionator as fractionator 11 according to the prior art.

In some cases, if desired, an aqueous calcium chloride solution or an aqueous lithium bromide solution is used in such a dehydrating operation. Such aqueous solutions are, of course, quite insoluble in the hydrocarbons with which they come in contact. As is well known, concentrated aqueous solutions of calcium chloride and of lithium bromide possess relatively low aqueous vapor pressures, and, accordingly, are quite suitable for an operation as disclosed herein.

It is realized by those skilled in the art that by use of a larger stream of desiccant than the 294 gallons per hour (about 5 gallons per minute) disclosed in the tabulation, the overhead material is dehydrated further, that is, to a lower hydrate forming temperature than that obtained with the 294 gallons per hour.

It is realized that countercurrent contacting is more efficient than concurrent contacting accomplished in pipe 35 and the refrigerated condenser 37, or in the refrigerated condenser 37 alone, but as mentioned hereinbefore contacting by this method is found to be ample for accomplishing the intended purpose, and the apparatus required is much less expensive than that required for countercurrent contacting, as in the prior art.

While certain embodiments of the invention have been described for illustrative purposes, the invention obviously is not limited thereto.

I claim:

1. In a de-ethanizing operation wherein a feed stock contains ethane, hydrocarbons higher boiling than ethane, moisture and a hydrate forming material, the improvement comprising introducing said feed stock into a fractionation zone, maintaining said zone under de-ethanizing conditions wherein ethane, moisture and said hydrate forming material distill overhead as an overhead vaporous stream, cooling said overhead vaporous stream by heat exchange with a plant cooling water thereby condensing a portion of the moisture from said overhead vaporous stream, separating the condensed moisture from uncondensed overhead material, adding a stream of liquid desiccant to the uncondensed overhead material and passing this combined material into a refrigerated condenser therein producing condensate and said desiccant absorbs moisture, separating said condensate from the liquid desiccant containing absorbed moisture, and passing the separated condensate to said fractionation zone as reflux.

2. In the operation of claim 1, stripping absorbed moisture from said liquid desiccant containing absorbed moisture, and returning the stripped desiccant to the operation as the liquid desiccant added to the uncondensed overhead material.

3. In a de-ethanizing operation wherein a feed stock contains ethane, hydrocarbons higher boiling than ethane, moisture and a hydrate forming material, the improvement comprising introducing said feed stock into a fractionation zone, maintaining said zone under de-ethanizing conditions wherein ethane, moisture and said hydrate forming material distill overhead as an overhead vaporous stream, cooling said overhead vaporous stream by heat exchange with a plant cooling water thereby condensing a portion of the moisture from said overhead vaporous stream, separating the condensed moisture from uncondensed overhead material, passing said uncondensed overhead material and a stream of liquid desiccant into a refrigerated condenser therein producing condensate and said desiccant absorbs moisture, separating said condensate from the liquid desiccant containing absorbed moisture, and passing the separated condensate to said fractionation zone as reflux.

4. In a de-ethanizing operation wherein a feed stock contains material higher boiling than ethane, moisture and a hydrate forming material, the improvement comprising introducing said feed stock into a fractionation zone, maintaining said zone under de-ethanizing conditions wherein ethane, moisture and said hydrate forming material distill overhead therefrom as an overhead vaporous stream, cooling said overhead vaporous stream thereby producing condensed water, separating this condensed water from uncondensed gases, adding a liquid desiccant to said uncondensed gases, passing the combined stream of uncondensed gases and liquid desiccant into a refrigerated condenser and therein producing condensate, and said liquid desiccant absorbing at least a portion of said moisture, separating a condensate phase from a liquid desiccant phase containing moisture, and passing said liquid condensate to said fractionation zone as reflux.

References Cited in the file of this patent

UNITED STATES PATENTS

| | | |
|---|---|---|
| 2,151,248 | Vaughan | Mar. 21, 1939 |
| 2,258,015 | Keith | Oct. 7, 1941 |
| 2,258,016 | Keith | Oct. 7, 1941 |
| 2,288,461 | Keith | June 30, 1942 |
| 2,306,553 | Miller | Dec. 29, 1942 |
| 2,414,371 | Fragen | Jan. 14, 1947 |
| 2,567,228 | Morrell | Sept. 11, 1951 |
| 2,620,895 | Turner | Dec. 9, 1952 |
| 2,672,034 | Morrow | Mar. 16, 1954 |
| 2,747,002 | Walker | May 22, 1956 |
| 2,758,665 | Francis | Aug. 14, 1956 |
| 2,787,451 | Lavery | Apr. 2, 1957 |